5 Sheets—Sheet 1.
H. H. DAY.
CANAL AND NAVIGATION THEREOF.
No. 62,736. Patented Mar. 12, 1867.
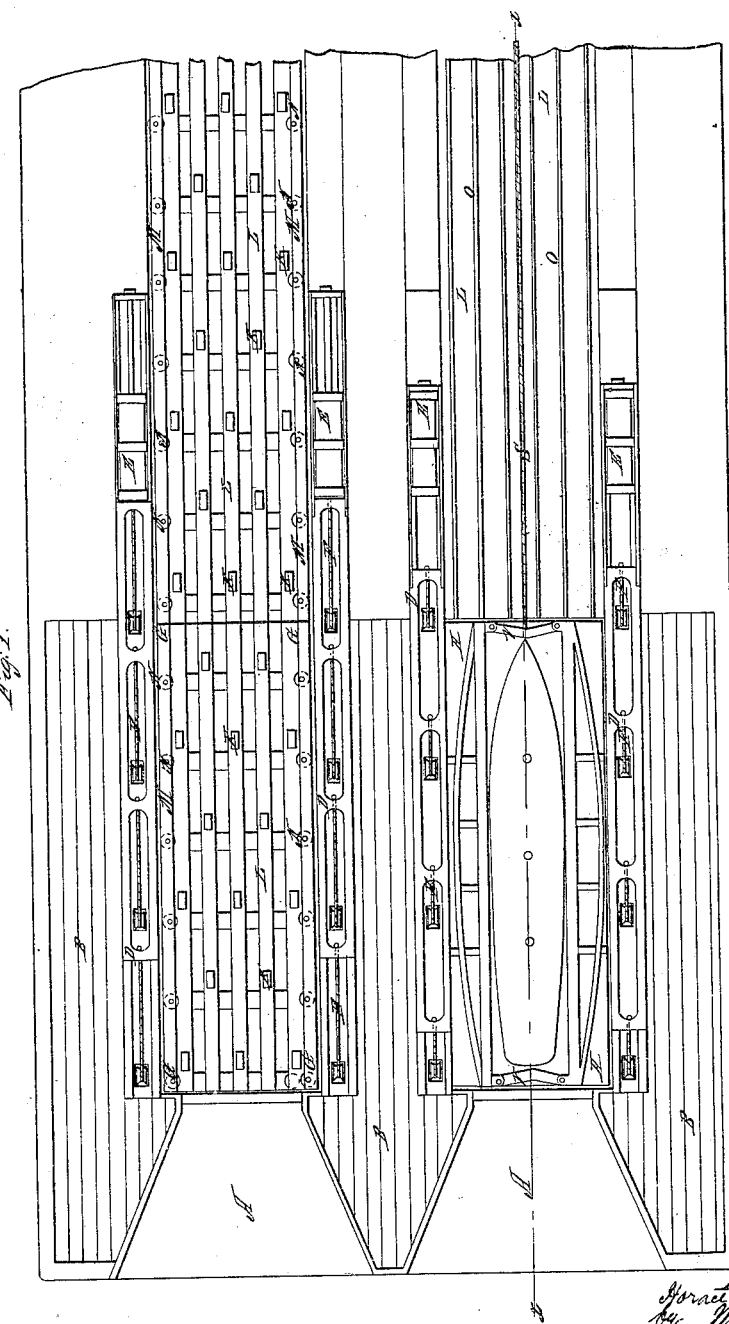
Witnesses:
William H. Roe
C. L. E. Topleff
Inventor:
Horace H. Day
by Munn & Co

H. H. DAY.
CANAL AND NAVIGATION THEREOF.
No. 62,736.  Patented Mar. 12, 1867.
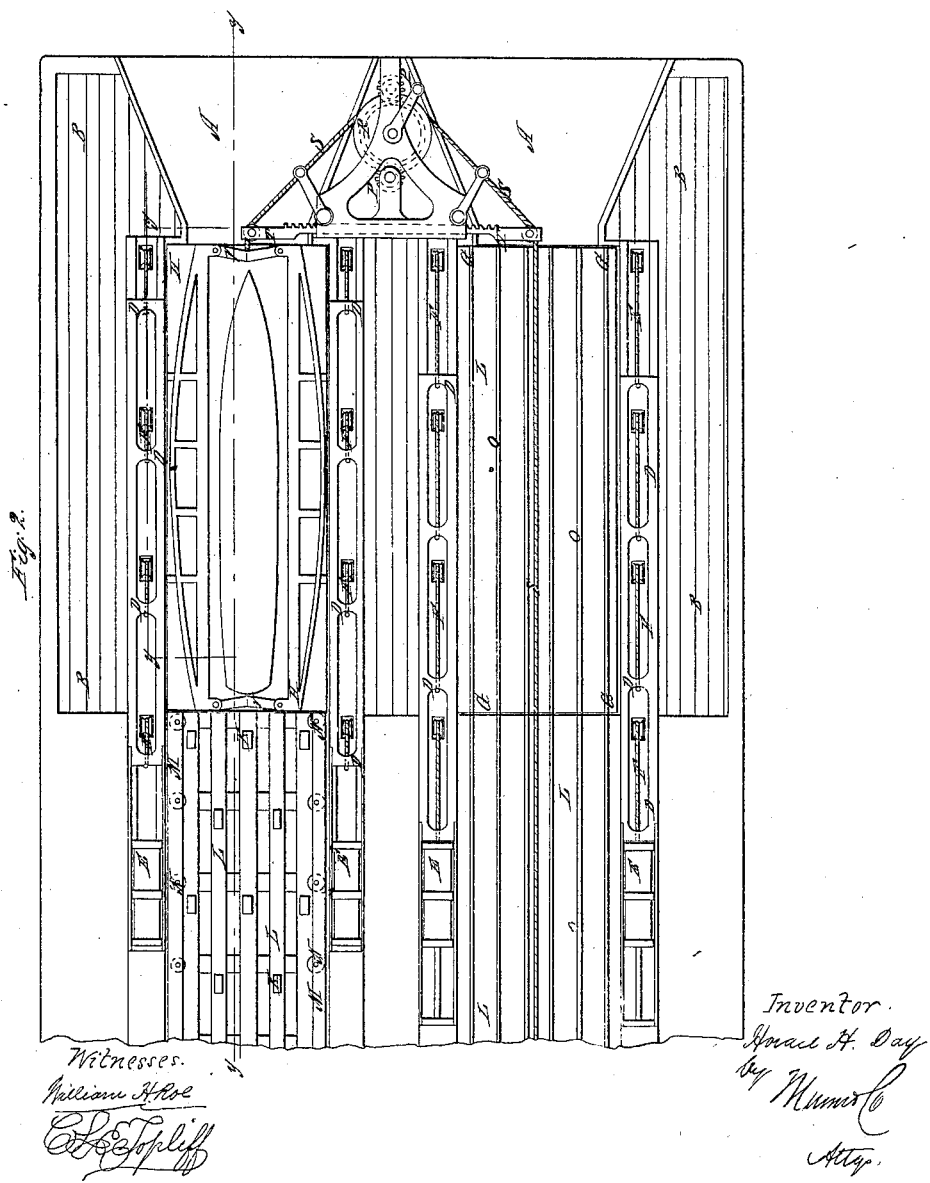

H. H. DAY.
CANAL AND NAVIGATION THEREOF.
No. 62,736. Patented Mar. 12, 1867.
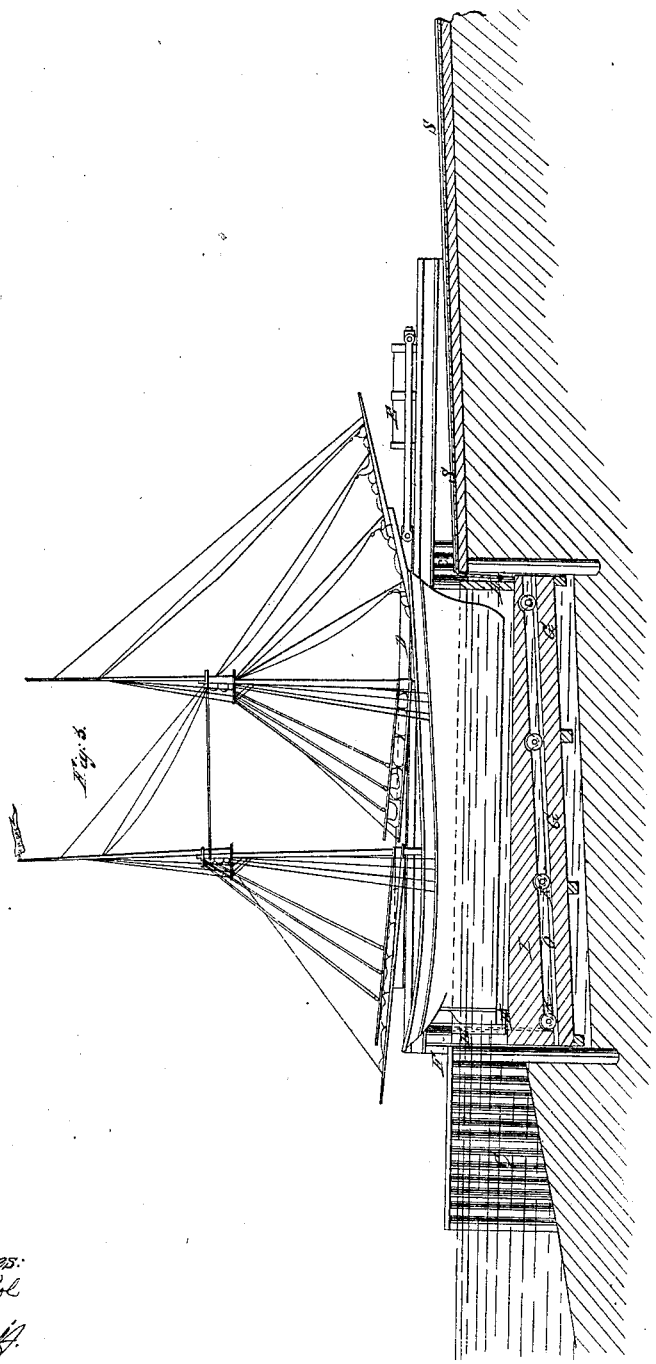

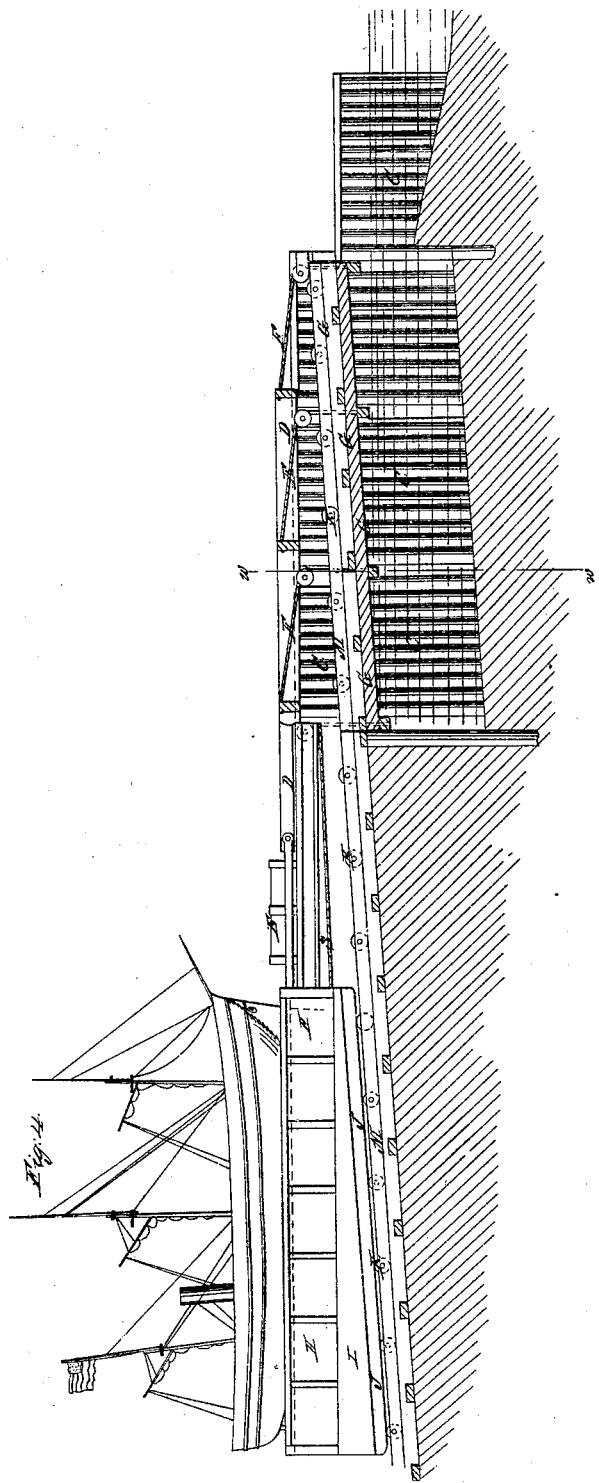

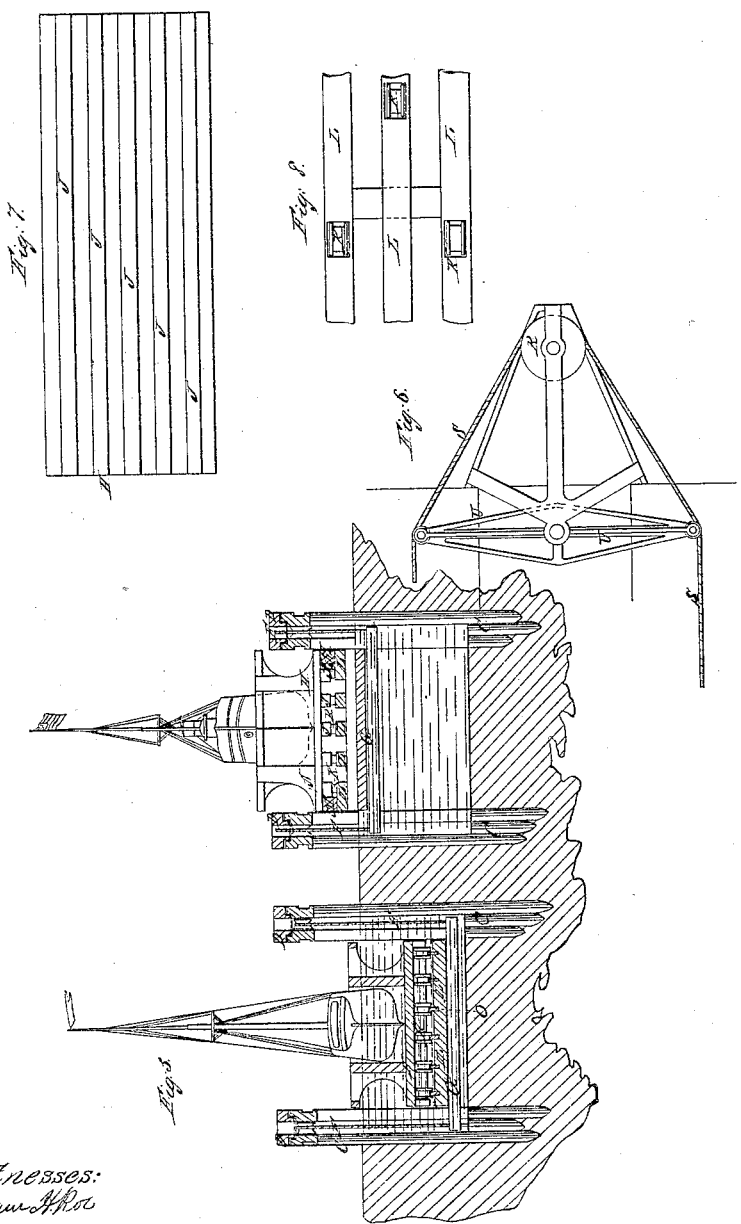

United States Patent Office.

HORACE H. DAY, OF NEW YORK, N. Y.

Letters Patent No. 62,736, dated March 12, 1867.

---

IMPROVEMENT IN CANALS, AND NAVIGATION THEREOF.

---

The Schedule referred to in these Letters Patent and making part of the same.

---

TO ALL WHOM IT MAY CONCERN:

Be it known that I, HORACE H. DAY, of the city, county, and State of New York, have invented a new and useful Improvement in Canal Navigation; and I do hereby declare that the following is a full, clear, and exact description thereof, which will enable others skilled in the art to make and use the same, reference being had to the accompanying drawings, forming part of this specification, in which—

Figure 1, Plate 1, is a top or plan view of the lower end of the incline where the vessel is transferred from or to the water in the lower level.

Figure 2, Plate 2, is a top or plan view of the upper end of the incline where the vessel is transferred to or from the water in the upper level.

Figure 3, Plate 3, is a vertical longitudinal section through the line $xx$, fig. 1, the vessel being represented as having been floated into the caisson preparatory to being raised.

Figure 4, Plate 4, is a vertical section through the line $y\,y$, fig. 2, the vessel and caisson being represented as not yet having reached the upper movable part of the incline.

Figure 5, Plate 5, is a vertical cross-section through the line $w\,w$, fig. 4.

Figure 6, Plate 5, represents a modification of the means for bringing the cable into a line with the weight to be sustained.

Figure 7, Plate 5, is a bottom view of the caisson, when the rollers or wheels are attached to the road sills.

Figure 8, Plate 5, represents a modification of the rollers attached to the road sills.

Similar letters of reference indicate like parts.

In the march of improvement which so distinguishes our age, little or no attention has been given to canals, and as a consequence their usefulness has been limited. Proceeding upon the proposition that all advantages to be derived from canal navigation are limited to the amount of water which can be flowed into their several higher levels from supplies upon or above each, relying entirely upon feeders, reservoirs, &c., to furnish the proper quantity, and then to pass the same from the upper to the lower levels in locking boats through, up and down, the real and much needed contribution to public want obtained is far less than should reasonably be demanded.

My invention contemplates an entire revolution of the present system, and at the same time is designed to afford canal facilities, and even ship transit, over and through places where, under any existing system, it would be physically impossible to construct and use canals. And it consists, first, in the combination of double-inclined planes with floating dry-docks, when the said planes are used for the passing of vessels from one water level to another; second, in the combination of inclined planes with canals, the sides of which are lined with stone or planking for the passage of steam-propelled vessels; third, in the ratchet-shafts, or their equivalent, for holding and moving the wire cable when detached from the caissons, and as a guide to the cable or cables; fourth, in making canals without discharging locks, when used in combination with a double-inclined plane for transportation; fifth, in making in combination two inclined planes, when used for passing vessels floating in water; sixth, in making water-tanks, caissons, or locks with a wedge-shaped bed or bottom to equalize the depth of water while passing ships up and down inclined planes; seventh, in making inclined planes with rollers or wheels upon the tracks, when used to transport canal locks or caissons containing vessels.

A are the passages or openings into the dry-docks, at the foot of the inclined planes leading into a basin in the lower level of the canal, or into any navigable water from or to which it is desired to transport vessels. B are the piers, which, in the case where the incline terminates at a navigable water, may be supported upon piles C in the ordinary manner; but when the incline terminates at a lower level of a canal the piers of the dock will require to be made of stone-work. Upon the top of the piers are placed large sliding-beams, D, one end of which is attached to the piston of powerful hydraulic pumps E. These pumps may be operated by engines placed on the piers. To these beams D are attached, at suitable distances apart, ropes F, passing over pulleys at the upper surface of the piers, and extending down and connecting with that portion G of the inclined track upon which the caisson and its contents are raised or lowered. As the pumps E are operated, the beams D are drawn forward, which raises the part G of the track, and with it the caisson H and its contents. By reversing the operation of the pumps the same parts are lowered into the dock. The bed of the dock must be deep enough to allow the part of the track G and the caisson H to sink so far beneath the surface of the water that vessels may float into the said docks above the said caissons, and float in and be carried up with the said caissons as they are raised by the said part G of the track. The interior of the caisson H should be of about the form of a vessel bottom, so that no more water need be carried than enough to float the vessel transported, and it should be of sufficient size to receive the largest vessels that navigate the canal. The outer or exterior part of the caisson H should be supported and braced in any of the known ways in all directions, so that it may easily sustain the outward pressure of the water that floats the transported vessel. The part G of the track upon which the caisson rests has the same inclination as the rest of the plane, but in order to diminish the strain upon the cable that draws the caisson up the inclined plane it is advisable that no more water should be carried in the caisson than sufficient to float the vessel or to balance a larger vesel in the other caisson. To accomplish this it is necessary that the bottom of the caisson should be parallel with the surface of the water within itself. Therefore I support the caisson upon a wedge-shaped portion, I, as seen in figs. 3 and 4. Upon the bottom of the said portion I, I place longitudinal bars or runners J, as shown in fig. 7, which run upon the rollers K as the caisson passes up and down the inclined planes. The track is formed of heavy timbers L laid parallel with each other and longitudinally with the track. They should be firmly bedded, either upon heavy cross-ties or in some other substantial manner, and should be well braced and guarded against lateral displacement. In these timbers L, in suitable bearings, are placed rollers K, upon which run the runners J of the caissons. Upon the outer edges of the outer timbers L, which form the track, are flanges M, of suitable size and strength to resist any side pressure and keep the caissons upon the tracks. Into the inner sides of these flanges are placed rollers N, which act against the sides of the outer runners J of the caissons, diminishing the friction. If thought advisable the rollers K may be made with flanges, as represented in fig. 8, plate 5. The track may be formed by laying rails O upon the longitudinal timbers L of the track, and attaching the wheels or rollers K to the bottom of the caisson. But I prefer the manner first described, for this reason, among others, that when said rollers are attached to the sills L they are exposed to view and can be readily examined after the passage of each caisson, and replaced, when necessary, without difficulty. Their bearings are also always accessible for oiling. The upper ends of the inclines are exactly similar to the lower ends already described, that is to say, the vessels are floated into the caissons and then raised or lowered in precisely the same manner and by the same means. The power for drawing the loaded caissons up the inclines and lowering them down is placed at the top of said inclines. In situations where water may be abundant it may be used as the power, or any other power may be employed. The power is applied to the gear-wheels P by any of the known methods. These gear-wheels P mesh into a gear-wheel placed immediately beneath and attached to the wheel or capstan R. This wheel R should be large, at least twenty feet in diameter, and the rope or cable S should pass around it three or four times to guard against its slipping. The rope S should be a heavy wire or chain cable, of a size and strength commensurate with the resistance to be overcome in transporting the vessels up and down the inclines. The ends of the cable S are attached to the caissons H in some suitable manner so that they can readily be detached when the said caissons have been drawn or lowered into proper position upon the movable part G of the track. When the cable is detached from the caissons at the lower end of the inclines it may be allowed to lie on the immovable part of the track until the caisson has been again raised preparatory to being drawn up the incline, when it may again be attached to the caisson. But when it is detached from the caissons at the upper end of the inclines, it becomes necessary to move the end of the cable off the track, so that it may not interfere with lowering the caisson into the water, or with floating the vessel out of the caisson into the canal. It is also necessary that the cable at the upper end of the inclines should be supported in such a position that the line of draught may be parallel with the central line of the track. These two objects are effected by the same apparatus. In fig. 2 it is represented as being accomplished by ratchet-shafts T. The ratchet-wheels that operate said shafts may be connected to and operated by the same power that operates the capstan or wheel R, the cable S passing around pulleys in the ends of the shafts T. By this arrangement, when the caisson has been drawn up into position upon the movable part G of the track, the end of the cable is detached from the caisson and the shaft T run back; this carries the end of the cable with it and removes both shaft and cable out of the way while the caisson is being lowered into the water and the vessel floated into the canal. In fig. 6 the same objects are represented as being accomplished by the swing bridge U, the cable in this case also passing over pulleys on the ends of the arms of the bridge. This latter method I prefer. By swinging these bridges out of the way the cable is carried with them, and the caissons may be lowered, as before described. In some cases it may be desirable to form the ends of the caissons of gates V, constructed and operated in a manner similar to the ordinary lock gates, as represented in figs. 1 and 2. In this case it will not be necessary for the caissons to sink as deeply into the docks as when the vessels are floated into said locks over the tops of the caissons, as before described. In some situations it may be necessary that the caissons and vessels should be transported for a small distance upon a level or upon an inclined plane of a different angle before being lowered or passing into the canal. In this case I make the wedge-shaped portion I of the caissons detachable, and form said wedge-shaped portion with rollers attached to its upper or level side, the upper part of the caissons having runners resting upon said rollers. The two parts of the caissons move up and down the inclined planes together, and when it is necessary for the caissons and vessels to pass on to the level part of the track, or on to an inclined plane of a different angle, the two parts are detached, the wedge-shaped part I remaining upon the inclined plane, and the other being drawn off as desired. By the introduction and use of these separate wedges I can dispense with the dry-dock, using the wedges upon a plane of greater angle of inclination for one section of the inclined plane, and pass the caisson with its wedge on to another section of different angle or inclination.

And also by this means I can raise and lower the ship from and into the beds of rivers or depressions in canals, as the case may require, but I prefer the dry-dock.

In the above description of my invention the means and power for drawing the loaded caissons up and lowering them down is represented as being placed at the upper end of the principal plane, and as acting upon a wire rope; but I do not intend to limit my claim to the use of this mode or application of moving power. I intend to use any known power, and application of it, in common use, for raising or lowering heavy bodies on inclined planes, and also for raising vessels out of the water and lowering them into it. I also contemplate the use of additional auxiliary power, in combination with one or more cables or chains, according to the varying circumstances occurring in the use of my machinery for passing vessels from one level to another. By this invention no water is required to be passed from one level to another, and thereby the cost of making canals in most places is greatly cheapened. Canals may also be built in this way over almost any country bordering upon ocean, lake, or river, and if necessary the water may be pumped into the levels from such sources; and when once a proper depth of water is obtained no more would afterwards be required than enough to supply the loss by evaporation or by soaking into the bed of the canal. The vast advantage to commerce and transit, and the ability to construct canals of any desired depth and width under my invention, are clearly apparent when the simple proposition is stated that no water is used for locking vessels through from one level to another. It will be observed that as a vessel floating in water displaces an amount equal to its own weight, the two caissons or locks, though carrying very different-sized vessels, will balance each other, therefore very little more power will be required to transport the vessels than sufficient to overcome the friction caused by the downward strain on the cable. It will also be observed that two vessels are floated into the caissons, one at each end of the inclined plane and are passed over said plane, one up and the other down, at the same time and by the same movement, thus saving a great amount of time in locking vessels through, to say nothing of the much less time required to pass a single vessel over a given elevation by my invention than by the use of locks as heretofore built. To guard against accidents from the breaking of the cable or of other parts of the machinery, I furnish the caissons with anchors, so constructed and arranged that they can instantly be dropped, and which will take hold and detain the caissons from rushing down the incline.

I contemplate the use of steam propellers upon canals, making their trips with the same certainty of time and the same economy of first cost of transit that they now do on rivers and other navigable waters. In this case the sides of the canals must be formed of stone-work or planking, to guard against the washing of the banks by the water put in motion by the passing steamers. In place of the "screw deck," so called, before described, I can use a dry-dock made of air-tight chambers, and raise the caisson and ship from the canal bottom in the manner well known to those engaged in docking vessels.

What I claim as new, and desire to secure by Letters Patent, is—

1. In the construction of the canals, double-inclined planes, in combination with floating dry-docks or movable camels, and their combination with canals for the raising and transportation of vessels from one water level to another, substantially as described.

2. The ratchet-shafts, or their equivalent, for holding or moving the wire or other cable, when used in combination with inclined planes and movable locks, substantially as described.

3. The water tanks, caissons, or locks, constructed with a wedge-shaped bottom, to hold water upon a level, for passing ships up and down inclined planes, substantially as described.

4. The water tanks, caissons, or locks containing water for passing vessels up and down inclined planes, in combination with stationary rollers or wheels placed in and revolving upon the bed of the inclined plane, substantially as described.

5. The wedge-shaped camels, or a detached segment or portion thereof, or both, upon inclined planes, for passing the same from one angle or inclination to another, and the combination of these wedge-shaped camels with one or more inclined planes, when used to transport vessels, substantially as described.

HORACE H. DAY.

Witnesses:
M. M. LIVINGSTON,
JAMES T. GRAHAM.